United States Patent [19]
Johnson et al.

[11] Patent Number: 5,959,819
[45] Date of Patent: Sep. 28, 1999

[54] RELIABLE FAULT TOLERANT POWER SUPPLY FOR A PROTECTIVE RELAY

[75] Inventors: Richard Arthur Johnson, Aliquippa; Deborah Kaltwasser Mort, Baden; William John Murphy, Monroeville, all of Pa.

[73] Assignee: Eaton Corporation, Cleveland, Ohio

[21] Appl. No.: 09/039,882

[22] Filed: Mar. 16, 1998

[51] Int. Cl.[6] .................................................. H02H 3/00
[52] U.S. Cl. ............................................ 361/93.6; 361/79
[58] Field of Search ................................ 361/93, 98–102, 361/86, 92, 94–97, 62–63, 65, 18, 78–79, 87, 47, 93.6; 307/64, 86

[56] References Cited

U.S. PATENT DOCUMENTS 4,352,138  9/1982  Gilker ......................................... 361/92
4,398,232  8/1983  Elmore ........................................ 361/47

*Primary Examiner*—Michael J. Sherry
*Attorney, Agent, or Firm*—Martin J. Moran

[57] ABSTRACT

The protective relay is primarily energized by a voltage transformer tap on the power circuit. The current transformers that provide the monitoring current to the protective relay also provide an auxiliary power input to the power supply circuit. A switching circuit monitors the input voltage and switches to the current feed to generate the relay supply voltage when the input voltage drops below a predetermined level. In one embodiment the fault tolerant power supply is provided as an optional, modular, add on unit. In a second embodiment, the power supply is an integral part of the protective relay where the current shares a common input between the monitoring and power circuit and the voltage input is common to both the power supply and any metering circuits contained within the protective relay.

2 Claims, 2 Drawing Sheets

RELIABLE FAULT TOLERANT POWER SUPPLY FOR A PROTECTIVE RELAY

BACKGROUND OF THE INVENTION

1. Field of the Invention

This invention pertains in general to power supplies for protective relays and more particularly to power supplies that include a backup power source in the event of a line voltage collapse.

2. Background Information

Protective relays are installed in electric power transmission and distribution facilities to detect overloads, short circuits, and other fault conditions. They are connected to power circuit breakers or switching devices that disconnect the faulty portion of the network on command from the relay, to isolate the problem. Reliable operation of relays is especially critical during short circuit faults, which must be rapidly isolated to minimize damage to equipment, plus the risk of fire and injury of personnel.

Overcurrent protective relays typically monitor the current load within a circuit downstream of a circuit breaker through current transformers which communicate with each phase of the monitored circuit. The relay monitors the time-current characteristics of the load through which it senses short circuit faults or overloads on the feeder circuit and trips the circuit breaker to disconnect the faulty feeder from the bus, which normally also supplies other feeders.

Modern protective relays are electronic, typically employing microprocessors, electronic displays, and data communications ports to exchange operating information with a central facility control system. The relays normally supply operating information, including load measurements, demand values, and circuit status to the control center. They require continuous power to perform these functions, as well as protection tasks during faults. The protective relays are commonly energized from a control power transformer connected to the monitored circuit between phases or from a phase to neutral, to step the power voltage down to a safe level suitable for the relay power supply input.

Under short circuit fault conditions generally, dangerous high currents will flow and the relay is expected to trip the breaker. However, the short circuit can also collapse the supply voltage causing loss of power to the protective relay, which will then fail to trip and isolate the fault. In general, multiple types of faults can cause the relay supply voltage to collapse below levels at which the relay can function, so users need a supply voltage source which is not solely dependent on the integrity of the monitored circuit. In weak-source applications, the supply voltage can collapse even with severe overloads, as well as for other faults. A common way of assuring a continued supply voltage source in large facilities is to provide a station backup battery supply. This solution, however, presents installation and maintenance cost concerns.

A second technique used to generate power for the protective relay is to employ auxiliary current transformers excited from the primary current transformers on the incoming power lines, that are used to supply the monitoring current input to the protective relay. This approach has the disadvantage of not generating sufficient power to energize the protective relay under very light current conditions. Also, the additional impedance presented by the auxiliary current transformers reduces the current available to the monitoring circuits which can also adversely affect the operating functions of the relay under light current conditions.

Accordingly, it is an object of this invention to provide an improved, reliable backup power source that does not require increased installation or maintenance costs. It is a further object to provide such a power source that maintains a sufficient input under light current conditions while not taxing the primary current transformers in a manner that would adversely affect the monitoring input to the protective relay.

SUMMARY OF THE INVENTION

This invention accomplishes the foregoing objectives by primarily powering the protective relay from a voltage transformer tap on the power circuit or bus that is monitored. A switching circuit monitors the voltage input to the relay and automatically transfers the relay power supply responsibility to the primary current transformers, which normally supply the monitoring input to the protective relay, when the voltage supply drops below a predetermined level.

In the preferred arrangement the voltage tap is provided upstream of the protective relay and also feeds a metering input to the relay so that the line voltage can be monitored even with the breaker in a tripped condition. In one embodiment, the relay power supply circuit is a self contained modular unit that can be connected to the relay as an optional accessory. In a further embodiment, the power supply circuit is incorporated into the relay and shares the voltage input feeding the metering circuit and the current inputs feeding the monitoring circuits that perform the relay's protection algorithms.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
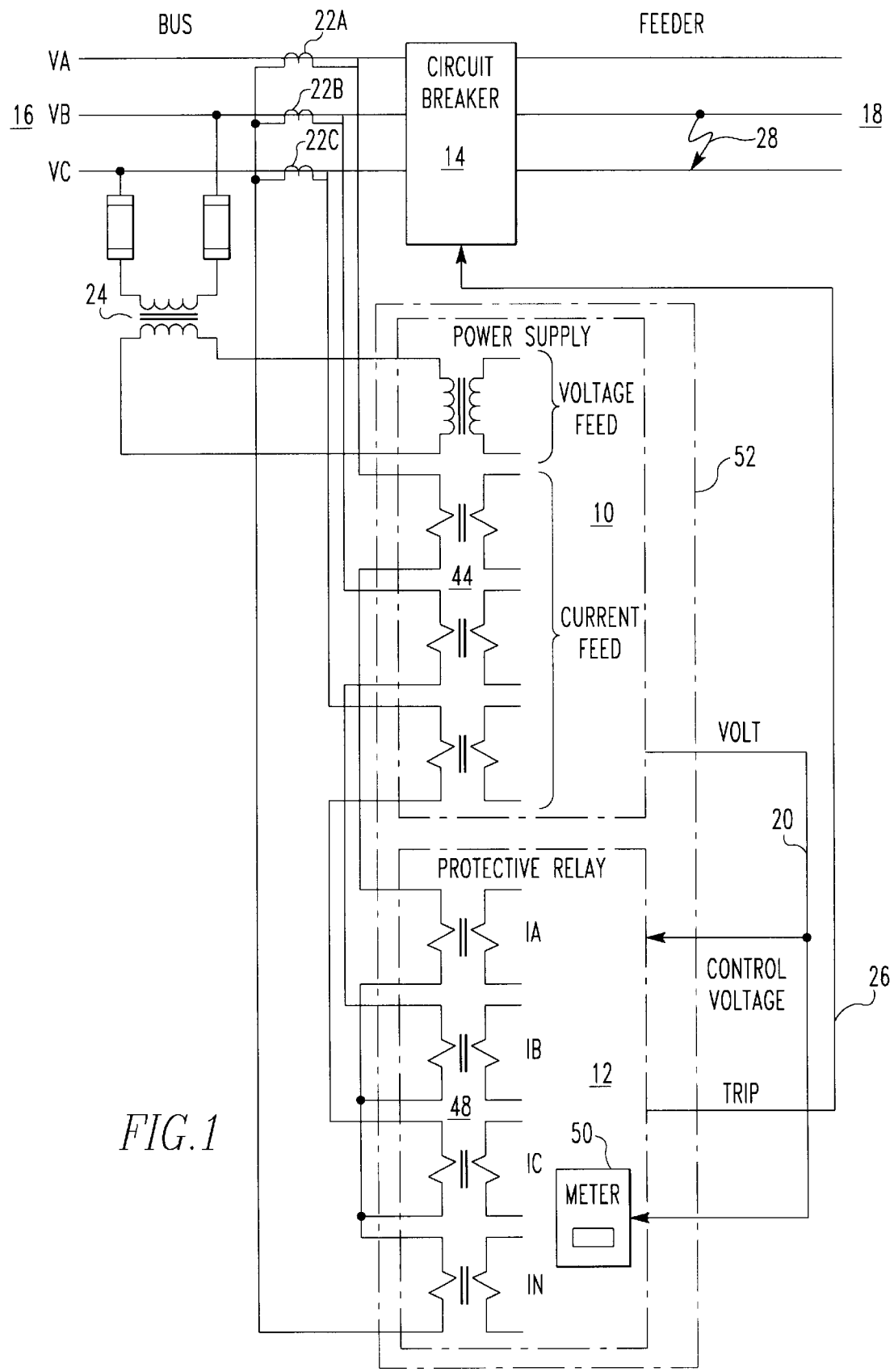
FIG. 1 is a schematic circuit diagram illustrating the power supply of this invention.

FIG. 1 illustrates a power supply 10 constructed in accordance with this invention for providing a voltage output 20 for energizing a protective relay 12. The power supply 10 receives inputs from current transformers 22A, B, C, which are respectively positioned to monitor the currents within each of the corresponding phases of the three-phase power supply bus 16. The current transformer outputs which form the inputs to the power supply are also connected in series to corresponding monitored current inputs to the protective relay 12. The monitored currents $I_A$, $I_B$, $I_C$ and $I_N$, the common neutral, are scaled to appropriate values by internal current transformers within the protective relay schematically shown in FIG. 1 by reference character 48. The protective relay monitors the time current characteristics of the input currents and supplies a trip signal 26 to open the circuit breaker 14 when preestablished setpoints have been exceeded. The power supply 10 also receives an input from a voltage transformer 24, which can be connected between phases or between any phase and neutral on the power bus 16.

As previously mentioned, if a voltage source, such as the transformer 24 is used to supply power to the power supply 10, then it is possible for that source to be interrupted under short circuit conditions, as figuratively illustrated by reference character 28, which can cause the voltage between phases to collapse. Alternatively, if the power supply 10 is energized from auxiliary transformers connected to the primary current transformers 22A, B and C, under light load current conditions there is not likely to be sufficient current to energize the protective relay. In addition, adding extra transformers in series with the monitoring inputs reduces the level of current available to the monitoring circuits to perform the protective algorithms.

Figure 2:
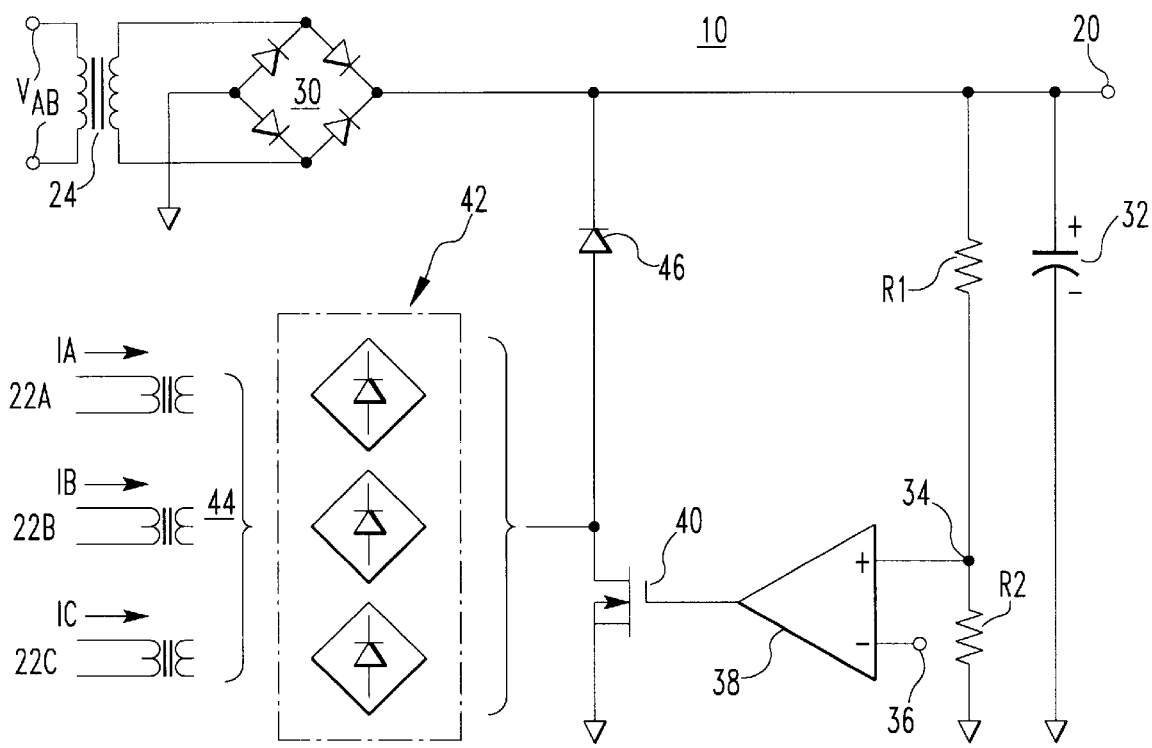
FIG. 2 is a schematic circuit diagram illustrating the switching circuit employed by this invention in the power supply illustrated in FIG. 1.

This invention overcomes the foregoing difficulties by providing a power supply that derives power from either the incoming line voltage or the currents, depending upon the state of the bus 16. The voltage source 24 has integrity as long as no fault is present. Should a fault condition occur that causes the power supply voltage 24 to drop significantly, power is then derived from auxiliary transformers 44 energized from the main current transformers 22A, B and C FIG. 2 is a simplified schematic of one illustrative embodiment of the "reliable fault tolerant power supply" 10 of this invention, designed to provide a reliable source of power for the protective relay circuits 12, shown schematically in FIG. 1. As shown in FIG. 2, under normal load conditions when the incoming line voltage is within specifications, the output voltage 20 is provided by a voltage transformer 24, rectifier bridge 30, and capacitor 32. Under these conditions, the level of voltage measured at node 34 is above a reference value applied to terminal 36. This combination of inputs, 34 and 36, through the comparator 38, achieves an output which is sufficient to maintain the transistor 40 in a conducting state. This arrangement effectively applies a short circuit load to the secondaries of the auxiliary transformers 44 and their corresponding rectifier bridges 42. In this state, the auxiliary transformers 44 supply no contribution to the output voltage 20 and negligible load to the main current transformers 22A, B and C, thus minimizing any effect on the monitoring currents inputted to the protective relay 12 as shown in FIG. 1.

When an overload or fault current on the bus 16 is high enough to cause the incoming source voltage to drop too low to support the output voltage 20 of the power supply 10, the voltage measured at node 34 in FIG. 2 drops below the reference voltage applied to terminal 36, and the comparator 38 transitions and turns off transistor 40 opening the circuit between the rectifiers 42 and the ground connection through the transistor 40. Current from the secondaries of the auxiliary current transformers 44 then passes through the corresponding control rectifier bridges 42 and through diode 46 to charge the capacitor 32 and provide the desired level of voltage to the output 20. The transistor 40 remains in its off state until the voltage at reference terminal 34 is sufficient to cause the transistor to turn on. The circuit operates as a "shunt regulator" providing the required output voltage in this mode of operation. The auxiliary current transformers are designed to provide the maximum control current required by the protective relay at a predetermined level of line over-current, e.g., 2 to 2.5 times rated load current. Under most fault conditions that would cause the power supply voltage to drop below a level that could effectively power the protective relay, the current levels increase sufficiently so that the auxiliary current transformers 44 do not impose an unmanageable load on the primary current transformers 22A, B and C. Thus the input currents applied to the monitoring current transformers 48 are maintained at sufficient levels to support the processing of the algorithms used to generate the trip signals 26.

The power supply 10 illustrated in FIG. 1 is shown as a self contained modular unit that can be connected between the bus 16 and the protective relay 12. A cost savings can be achieved in some instances if the power supply 10 is actually incorporated within the protective relay 12 housing as an integral component figuratively represented by the dotted lines 52. In this latter arrangement both the monitoring circuits and power supply can share common transformers 48. In addition, the voltage transformer can provide inputs to both the power supply and the metering function 50 of the protective relay if one is included. There is a further advantage in locating the voltage transformer on the bus side of the circuit breaker 14, for protective relays that include a metering function. In this arrangement the bus can be monitored with an open breaker to determine the state of the power source and its readiness to resupply the load once the fault in the feeder circuit is corrected.

Accordingly, the "reliable fault tolerant power supply" of this invention has an advantage of providing a simple low cost voltage source for protective relays during normal, overload, and fault conditions. It eliminates the need for a cost prohibitive noninterruptable control power source such as a station battery. Power is primarily supplied from the bus voltage or alternatively from the bus current if the supply voltage drops to unacceptable levels. Under conditions where the power supply is derived from the bus current the loading presented to the primary current transformers is low and decreases with increasing overload conditions.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breath of the claims appended and any and all equivalents thereof.

What is claimed is:

1. A protective electronic relay for tripping a circuit breaker under fault conditions comprising:

a voltage transformer having a primary winding connected to an electrical conductor on a source side of the breaker and a secondary winding connected to empower the relay;

a current transformer positioned to monitor the current in the electrical conductor and provide a representative input to the protective relay;

a switching circuit for monitoring the voltage input to the protective relay and switching to the current input to the protective relay to power the relay when the voltage input drops below a predetermined value;

wherein the voltage transformer provides a monitoring input to the protective relay for metering calculations; and a second current transformer within the protective relay for receiving monitored current inputs that identify fault conditions, wherein the second transformer provides both the monitored inputs and the power to the protective relay.

2. The protective relay of claim 1 wherein the switching circuit is located within a housing enclosing the protective relay.

* * * * *